United States Patent Office 3,381,633
Patented May 7, 1968

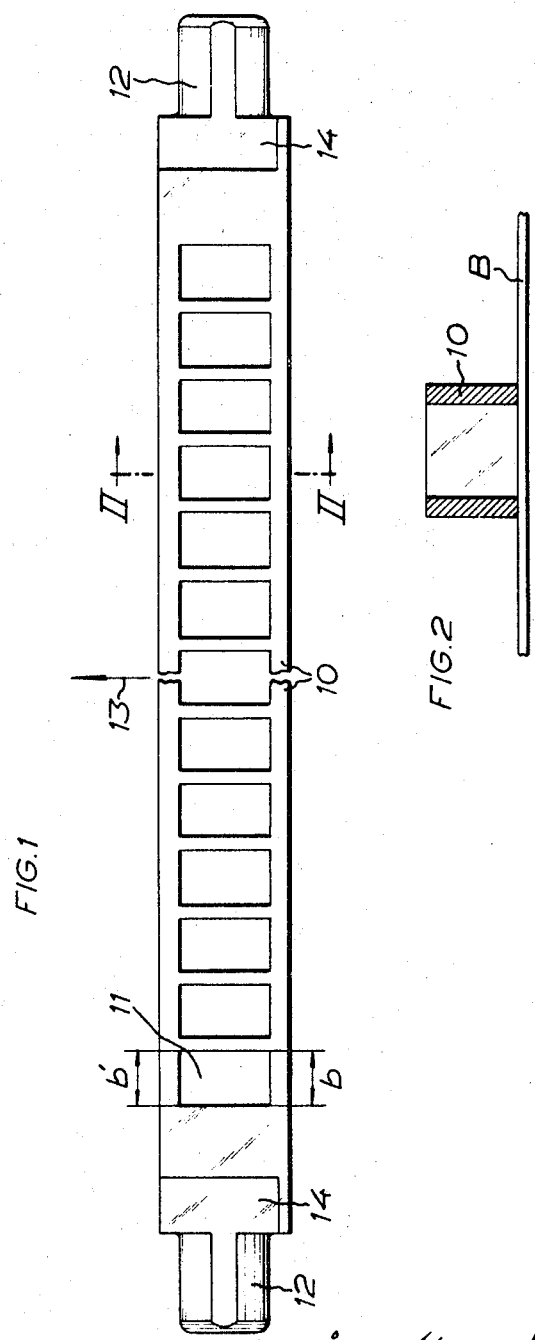

3,381,633
MOULD ELEMENTS FOR MACHINES FOR MOULDING PARALLELEPIPEDICAL ARTICLES
Ake Hans Gustaf Birch-Iensen, Arlov, Sweden, assignor to Svenska Sockerfabriks Aktiebolaget, Malmo, Sweden
Filed Sept. 28, 1966, Ser. No. 582,651
Claims priority, application Sweden, Oct. 4, 1965, 12,811/65
1 Claim. (Cl. 107—19)

This invention relates to a mould element having at least one open-ended mould cavity for a machine for making parallelepipedical moulded articles from a moist composition of sugar crystals, said composition being supplied to the mould cavities at one end thereof and compacted in said mould cavity by vibrating the mould element simultaneously as the latter is moved on a base member closing the other end of the mould cavity substantially parallel to one pair of opposite side surfaces of the mould cavity, the vibration taking place transversely of the direction of motion of the mould element.

Such a mould element and the machine in which it is used are exhaustively described in U.S. Patent No. 3,005,420.

In connection with the manufacture of moulded cubes of sugar in such a machine it has been found that the cubes made are not exactly parallelepipedical even though the mould cavities of the mould element are worked into a precise parallelepipedical shape, but will be narrower at the front end as viewed in the direction of motion of the mould element, whereby the appearance of the moulded cubes of sugar is deteriorated and grouping of the moulded cubes of sugar for the ranged packaging thereof is rendered difficult. The reason for this deterioration of the intended regular shape of the cubes of sugar has not been fully explained, but it is known that several factors collectively contribute to said deterioration. One such factor will be the irregular distribution of the relatively inert composition of sugar crystals when it is supplied to the mould cavities at the one end thereof, while other such factors reside in the vibration of hte mould element and the relative movement between the mould element and the base member. On the other hand, the height of the sugar cubes (usually 15-20 mm.) does not seem to influence the deterioration of the intended regular shape of the cubes.

The present invention provides a mould element of the type outlined in the foregoing, in which the above-mentioned shortcoming has been eliminated in that the mutual distance between said two side surfaces has been made slightly greater at the leading end of the mould cavity, as viewed in the direction of motion, than at the trailing end thereof.

For better elucidation, the invention will be described more in detail in the following with reference to the accompanying drawing, in which FIG. 1 is a plan view of a mould element as seen from the side which is to face the base;

FIG. 2 is a cross-sectional view on line II—II in FIG. 1.

The mould element illustrated is constructed substantially in the same way as the mount element shown in FIGS. 5-7 of the above-mentioned patent. The mould element is a rod or bar 10 of uniform thickness and rectangular cross-sectional shape, said bar having a plurality of open-ended mould cavities 11 distributed along it and extending between two oppposite longitudinal side surfaces of the bar, which is intended to bear against the base member B with one of said side surfaces (the one shown in the drawing). The base member B may be a steel belt arranged as an endless conveyor. At each end the bar has a substantially cylindrical pin 12 which extends at right angles from the end surface, said pins serving as means allowing the bar to engage a drive and control mechanism by which the bar is advanced in the direction marked by the arrow 13 over the base member which closes the one ends of the open-ended mould cavities, and also to engage a vibrator for longitudinally vibrating the bar. At the surface which is to bear against the base-member the bar inside each pin 12 has a surface portion 14 which is arranged in an oblique position at a small angle to the remaining surface, said surface portion 14 serving to raise the bar from the base member during the vibrating operation, as is exhaustively described in said above-mentioned patent.

The mould cavities 11 are substantially parallelepipedical and of the same size and shape as a conventional sugar cube, but according to the invention there occurs a slight deviation from the exact parallelepipedical shape in that the mould cavities for the reasons outlined in the foregoing are somewhat wider at that end which is to be the leading one in the contemplated direction of motion of the bar, said direction being marked by the arrow 13. The deviation is but slight: if the width $b$ of a mould cavity at the trailing end is 10.05 mm., the width $b'$ at the leading end of the mould cavity is equal to 10.20 mm. This slight difference has proved sufficient to provide compensation for that deviation from the exact parallelepipedical shape which occurs in the cubes made in mould cavities having exact parallelepipedical shape with the use of the described mould element in a machine of the type shown in the above-mentioned patent.

In the practical use of the mould element according to the invention said element and said base member have been advanced synchronously at a speed of 15–20 m. per minute in the direction of the arrow 13. During vibration of the mould element longitudinally at an amplitude of at least ±1.5 mm. and at most ±2.5 mm. the mould cavities of the mould element have been filled with a composition of sugar crystals while the mould element and the base member move approximately ⅓ m. and the composition of sugar crystals in said mould cavities has been compacted by similar vibration while the mould element and the base member likewise move approximately ⅓ m. With the use of a composition of sugar crystals of uniform crystal population sugar cubes having a density of 0.95–1.00 gram per cu. cm. have been manufactured, and despite said difference between the measures $b'$ and $b$ the sugar cubes could re regarded as exactly parallelepipedical. The same excellent result has been reached with the use of a composition of sugar crystals from several crystal populations, in which case the sugar cubes can be given a density of more than 1.00 gram per cu. cm.

What I claim and desire to secure by Letters Patent is:

1. In a mould element for making parallelepipedical moulded cubes from a moist composition of sugar crystals by vibrating said mould element to compact said composition in at least one mould cavity formed by said mould element at the same time moving such element in a direction substantially perpendicular to the vibrating movement, comprising a bar having two opposite flat surfaces, said mould cavity extending through said bar between said surfaces substantially perpendicularly to the intended movement of said element as well as to the intended vibrating movement and opening at its opposite ends at said surfaces, at least one of said ends being closed by an external separate base member when the mould element is in use, two opposite flat end walls and two opposite flat side walls bounding said mould cavity and joining each other at four corners thereof, said end walls being substantially parallel with each other and being substantially perpendicular to the intended direction of movement of said mould element, said side walls extending in the intended direction of movement of said mould element, the improvement that said flat side walls diverge slightly in the intended direction of movement of said mould element to the leading end of said mould cavity.

References Cited

UNITED STATES PATENTS

| 2,157,570 | 5/1939 | Raynolds | 107—8 |
| 3,005,420 | 10/1961 | Wiklund et al. | 107—8 |

FOREIGN PATENTS 930,216 7/1963 Great Britain.

WALTER A. SCHEEL, *Primary Examiner.*

A. O. HENDERSON, *Assistant Examiner.*